US009973856B2

(12) United States Patent
Huang

(10) Patent No.: US 9,973,856 B2
(45) Date of Patent: May 15, 2018

(54) ULTRATHIN ELECTROMAGNETIC VIBRATION DEVICE AND ITS MANUFACTURING METHOD

(76) Inventor: Xinmin Huang, Ningbo (CN)

( * ) Notice: Subject to any disclaimer, the term of this patent is extended or adjusted under 35 U.S.C. 154(b) by 0 days. days.

(21) Appl. No.: 13/806,934

(22) PCT Filed: Apr. 12, 2012

(86) PCT No.: PCT/CN2012/073861
§ 371 (c)(1),
(2), (4) Date: Dec. 26, 2012

(87) PCT Pub. No.: WO2012/155725
PCT Pub. Date: Nov. 22, 2012

(65) Prior Publication Data
US 2014/0054981 A1 Feb. 27, 2014

(30) Foreign Application Priority Data

May 19, 2011 (CN) .......................... 2011 1 0132477
May 19, 2011 (CN) ..................... 2011 2 0164230 U

(51) Int. Cl.
*H04R 9/04* (2006.01)
*H04R 7/18* (2006.01)
(Continued)

(52) U.S. Cl.
CPC ......... *H04R 9/046* (2013.01); *H02K 41/0354* (2013.01); *H04R 7/18* (2013.01);
(Continued)

(58) Field of Classification Search
CPC ...................... H02K 41/0354; H02K 41/0356
(Continued)

(56) References Cited

U.S. PATENT DOCUMENTS 4,410,768 A * 10/1983 Nakamura ............... H04R 7/02
181/167
6,259,800 B1 * 7/2001 Tagami .................... H04R 9/06
381/398

(Continued)

FOREIGN PATENT DOCUMENTS

GB 2358545 A * 7/2001 ............... H04R 7/02
WO WO 2010046132 A1 * 4/2010 ............... H04R 7/02

*Primary Examiner* — Thomas Truong
(74) *Attorney, Agent, or Firm* — Raymond Y. Chan; David and Raymond Patent Firm

(57) ABSTRACT

An ultrathin electromagnetic vibrating device and its manufacturing method, wherein the ultrathin electromagnetic vibrating device includes: a base frame, a vibrating reed, a set of surrounds, a voice coil and a magnetic circuit system, wherein the surrounds include an upper surround and a lower surround, respectively connected with an upper surface and a lower surface of the vibrating reed to fixedly connecting the vibrating reed with a base of the base frame. Due to an application of the lower surround to form a combined action of the upper and lower surround, the vibrating reed is only able to keep vibrating up and down vertically, a first end of the voice coil is fixedly provided on the lower surface of the vibrating reed, similarly, while a stroke of the voice coil drives the vibrating reed to vibrate up and down vertically, the voice coil achieves an up-and-down vertical stroke.

17 Claims, 4 Drawing Sheets

(51) Int. Cl.
    *H02K 41/03*       (2006.01)
    *H02K 41/035*     (2006.01)
    *H04R 9/06*        (2006.01)
    *H04R 31/00*      (2006.01)
    *H04R 9/02*        (2006.01)

(52) U.S. Cl.
    CPC .............. *H04R 9/025* (2013.01); *H04R 9/045* (2013.01); *H04R 9/06* (2013.01); *H04R 31/006* (2013.01); *Y10T 29/49005* (2015.01)

(58) Field of Classification Search
    USPC ........................ 310/12.16, 25; 381/396, 421
    See application file for complete search history.

(56) References Cited

U.S. PATENT DOCUMENTS

| | | | |
|---|---|---|---|
| 6,490,363 B1 * | 12/2002 | Liu ........................... | 381/403 |
| 6,526,151 B1 * | 2/2003 | Peng ........................ | 381/403 |
| 6,774,510 B1 * | 8/2004 | Moro et al. ............... | 310/12.24 |
| 7,185,735 B2 * | 3/2007 | Sahyoun ................... | H04R 7/122 |
| | | | 181/147 |
| 7,515,728 B2 * | 4/2009 | Kobayashi et al. ....... | 381/398 |
| 2002/0094103 A1 * | 7/2002 | Babb ........................ | H04R 9/046 |
| | | | 381/396 |
| 2004/0086150 A1 * | 5/2004 | Stiles ........................ | 381/421 |
| 2005/0041831 A1 * | 2/2005 | Stiles ........................ | H04R 9/022 |
| | | | 381/412 |
| 2009/0185711 A1 * | 7/2009 | Shigeta .................... | H04R 9/06 |
| | | | 381/413 |
| 2011/0299716 A1 * | 12/2011 | Reckert .................... | H04R 7/02 |
| | | | 381/398 |

\* cited by examiner

ULTRATHIN ELECTROMAGNETIC VIBRATION DEVICE AND ITS MANUFACTURING METHOD

CROSS REFERENCE OF RELATED APPLICATION

This is a U.S. National Stage under 35 U.S.C 371 of the International Application PCT/CN2012/073861, filed Apr. 12, 2012, which claims priority under 35 U.S.C. 119(a-d) to CN 201110132477.1 and CN 201120164230.3, filed May 19, 2011.

BACKGROUND OF THE PRESENT INVENTION

Field of Invention

The present invention relates to a vibrating device, and more particularly to an ultrathin electromagnetic vibrating device and its manufacturing method, wherein a surround is added to replace a function of a damper, so as to change a thickness of a conventional electromagnetic vibrating device.

Description of Related Arts

It is generally known that a speaker is a common electromagnetic vibrating device, and the speaker is commonly called a "horn", which is an electroacoustic device converting electric energy into acoustic energy. A manufacturing process of a traditional electromagnetic vibrating device comprises: gluing a T-yoke or a U-yoke; gluing a basket and a magnetic circuit; installing terminals; putting in a damper; plugging in a voice coil; and putting in a vibrating reed and a surround. Firstly, materials needed should be prepared, and then the electromagnetic vibrating device is made by hand, from top to bottom, inside and out. Wherein the damper, also called a spider, is a main element in a vibrating system of a cone electromagnetic vibrating device, the damper are corrugated rings made of cotton, silk, glass cloth, etc., which are impregnated with phenolic and hot-pressed into the corrugated rings. Main functions of the damper are as follows.

(1) The damper keeps the voice coil in a correct position in a magnetic gap. The damper has a large axial compliance, in such a manner that the voice coil is able to vibrate vertically in the magnetic gap. In a radial direction, the damper reliably restricts left and right movements of the voice coil, in such a manner that the voice coil is not in contact with a washer and the T-yoke;

(2) The damper provides a restoring force to the electromagnetic vibrating device as a supporter, and has an effect on a mechanical Q value, also called damping characteristic, of the electromagnetic vibrating device;

(3) The damper, a cone, and a voice coil suspension system codetermine a resonance frequency and a natural resonant frequency of the electromagnetic vibrating device; and (4) The damper of the electromagnetic vibrating device plays a role of a buffer and a mechanical limiter.

Based on above functions of the damper, in the traditional electromagnetic vibrating device, an inner ring of the damper is fixedly connected with the voice coil, an outer ring surface of the damper is fixedly connected with a base frame of the electromagnetic vibrating device, thus, a thickness of the electromagnetic vibrating device is limited in some degree.

However, with a development of the society and a continuous improvement of people's living standard, people hope electronic products, such as LCD TVs, notebooks, computers, mobiles, to be thinner and thinner, meanwhile, people pay more attention to acoustic fidelities of the electronic products. But the thickness of the ordinary electromagnetic vibrating device used in the electronic products is limited by the damper. The damper and the surround are used to keep the voice coil and the vibrating reed in balanced strokes in the electromagnetic vibrating device. In the traditional electromagnetic vibrating device, an inner connecting surface of the damper is fixedly provided in a central position of the voice coil via glue, and an outer connecting surface of the damper is fixedly provided on the base frame of the electromagnetic vibrating device via glue, thus, a length of the voice coil and a thickness of the base frame are limited by the damper, the thickness of the electromagnetic vibrating device is further limited and is not able to meet demands that the electronic products put on the electromagnetic vibrating devices. Meanwhile, as time goes by, glues on the damper and the voice coil of the traditional electromagnetic vibrating device will age, or even degum, which will cause a change of the acoustic fidelity of the electromagnetic vibrating device or a scrapping of the whole electromagnetic vibrating device.

SUMMARY OF THE PRESENT INVENTION

A main object of the present invention is to provide an ultrathin electromagnetic vibrating device and its manufacturing method, wherein the ultrathin electromagnetic vibrating device comprises a base frame, a vibrating reed, a set of surrounds, a voice coil and a magnetic circuit system, wherein the surrounds comprise an upper surround and a lower surround, the upper surround and the lower surround both have a first connecting surface provided on a corresponding inner edge of a corresponding inner ring surface thereof, respectively and fixedly provided on outer edges of an upper surface and a lower surface of the vibrating reed, and the upper surround and the lower surround both have a second connecting surface provided on a corresponding outer edge of a corresponding outer ring surface thereof, respectively and fixedly provided on inner edges of an upper surface and a lower surface of the base frame. A first end of the voice coil is fixedly connected with the vibrating reed in a central position of the lower surface thereof, and the magnetic circuit system is fixedly connected with the base frame. Due to an application of the lower surround to form a combined action of the upper surround and the lower surround, the vibrating reed and the voice coil are able to be in an up-and-down vertical stroke when working. A damper in a traditional electromagnetic vibrating device is replaced, in such a manner that a thickness of the electromagnetic vibrating device will not be limited by the damper, to meet demands that electronic products put on the electromagnetic vibrating devices.

Another object of the present invention is to provide an ultrathin electromagnetic vibrating device and its manufacturing method, wherein the manufacturing method comprises: putting a base frame, an upper surround, a vibrating reed, and a lower surround into a base frame mould in turn, and integrating into a whole via injection molding and insert molding. A special industrial structure design and a unique manufacturing procedure completely replace an application of glue to promote a product quality and improve a product pass rate.

Accordingly, in order to accomplish the above objects, the present invention provides an ultrathin electromagnetic vibrating device comprising: a base frame, a vibrating reed, a set of surrounds, a voice coil and a magnetic circuit system; wherein the base frame comprises a base and a connecting frame, the base has a hole provided in a central position thereof, the connecting frame is fixedly provided on the base, two metal terminals are provided on the connecting frame, the vibrating reed is provided in a position of the hole on the base, the surrounds are fixedly connected with the vibrating reed and the base respectively, the surrounds comprise an upper surround and a lower surround, wherein the upper surround and the lower surround both have a first connecting surface provided on a corresponding inner edge of a corresponding inner ring surface thereof, respectively and fixedly provided on outer edges of an upper surface and a lower surface of the vibrating reed, the upper surround and the lower surround both have a second connecting surface provided on a corresponding outer edge of a corresponding outer ring surface thereof, respectively and fixedly provided on inner edges of an upper surface and a lower surface of the base frame, further, the vibrating reed is fixedly provided on the base via connecting with the upper surround and the lower surround, further, the upper surround and the lower surround are respectively and fixedly connected with the upper surface and the lower surface of the vibrating reed in opposite directions, and are also fixed between the upper surface and the lower surface of the base, a first end of the voice coil is fixedly connected with the vibrating reed in a central position of the lower surface thereof, a second end of the voice coil is put in the magnetic circuit system, the voice coil comprises a connecting terminal for connecting with the metal terminals on the connecting frame, it is worth mentioning that the upper surround and the lower surround are respectively connected with the upper surface and the lower surface of the vibrating reed, for fixedly connecting the vibrating reed with the base of the base frame, on the other hand, due to an application of the lower surround to form a combined action of the upper surround and the lower surround, the vibrating reed is only able to keep vibrating up and down vertically, the first end of the voice coil is fixedly provided on the lower surface of the vibrating reed, similarly, while a stroke of the voice coil drives the vibrating reed to vibrate up and down vertically, the voice coil achieves an up-and-down vertical stroke, in such a manner that a function of a damper in a traditional electromagnetic vibrating device is replaced.

The magnetic circuit system and the base frame is fixedly connected, further, the magnetic circuit system is fixedly connected with the connecting frame of the base frame.

Meanwhile, the present invention provides a manufacturing method of an ultrathin electromagnetic vibration device comprising:

a) putting the upper surround, the vibrating reed, the lower surround and connecting frame into a base frame mould in turn, and integrating into the base frame via insert molding;

b) putting a U-yoke, a locating plate, a magnet and a top plate into a connecting frame mould in turn, and integrating into a whole to form the magnetic circuit system;

c) fixedly connecting the first end of the voice coil with the vibrating reed in the central position of the lower surface thereof; and d) fixedly connecting the base frame with the magnetic circuit system.

Further, the base frame and the magnetic circuit system are fixedly bonded via ultrasound, or other methods, such as turnbuckle, hot-melting, riveting, and locking screw.

A benefit of the present invention is to provide an ultrathin electromagnetic vibrating device and its manufacturing method, wherein the ultrathin electromagnetic vibrating device comprises: a base frame, a vibrating reed, a set of surrounds, a voice coil and a magnetic circuit system, wherein the surrounds comprise an upper surround and a lower surround, wherein the upper surround and the lower surround both have a first connecting surface provided on a corresponding inner edge of a corresponding inner ring surface thereof, respectively and fixed provided on outer edges of an upper surface and a lower surface of the vibrating reed, the upper surround and the lower surround both have a second connecting surface provided on a corresponding outer edge of a corresponding outer ring surface thereof, respectively and fixedly provided on inner edges of an upper surface and a lower surface of the base frame. A first end of the voice coil is fixedly connected with the vibrating reed in a central position of the lower surface thereof, and the magnetic circuit system is fixedly connected with the base frame. Due to an application of the lower surround to form a combined action of the upper surround and the lower surround, the vibrating reed is only able to keep vibrating up and down vertically. The first end of the voice coil is fixedly provided on the lower surface of the vibrating reed. Similarly, while a stroke of the voice coil drives the vibrating reed to vibrate up and down vertically, the voice coil achieves an up-and-down vertical stroke, in such a manner that a thickness of the electromagnetic vibrating device will not be limited. The vibrating reed and the upper and lower surrounds structure are integrated into a whole by adopting a unique design structure. A damper in a traditional electromagnetic vibrating is replaced to meet demands that electronic products put on the electromagnetic vibrating devices. In addition, the base frame, the upper surround, the vibrating reed and the lower surround are put into a base frame mould in turn, which are integrated into a whole via injection molding and insert molding. A special industrial structure design and a unique manufacturing procedure completely replace an application of glue to promote a product quality and improve a product pass rate.

These and other objectives, features, and advantages of the present invention will become apparent from the following detailed description, the accompanying drawings, and the appended claims.

DETAILED DESCRIPTION OF THE PREFERRED EMBODIMENT

Figure 1:
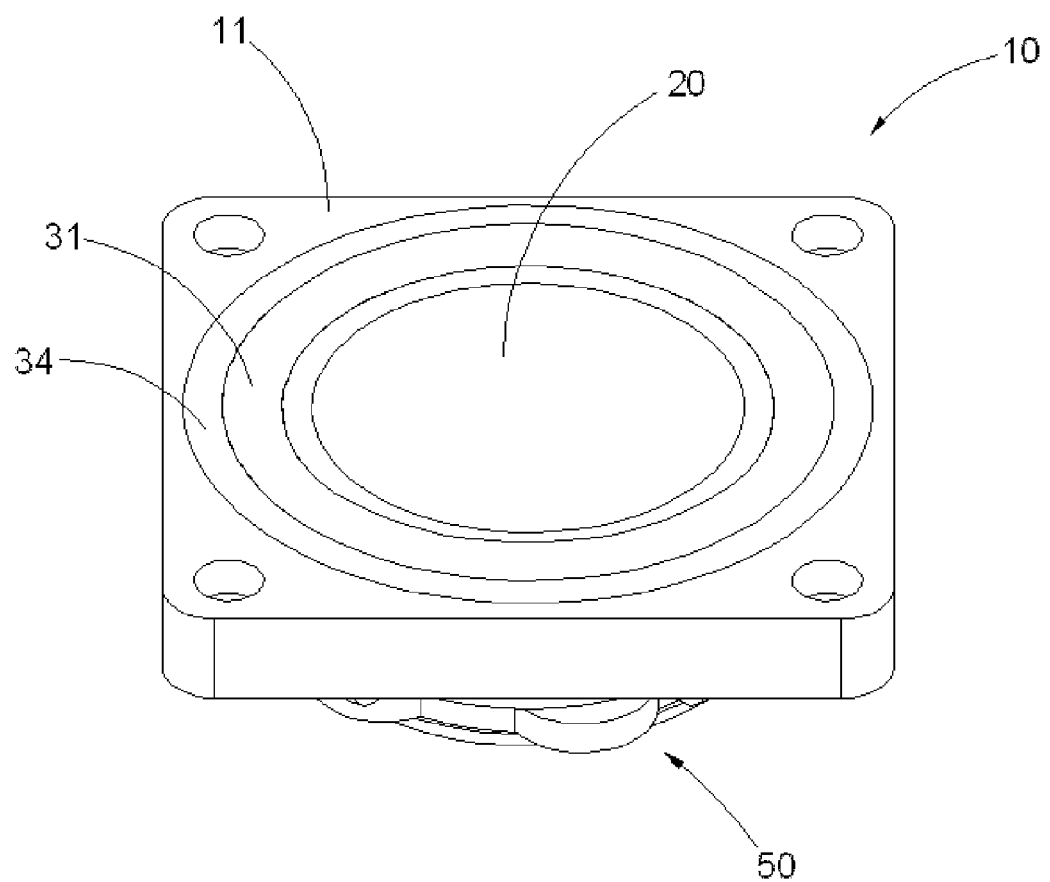
FIG. 1 is a perspective view of an ultra electromagnetic vibration device according to a preferred embodiment of the present invention.
Figure 2:
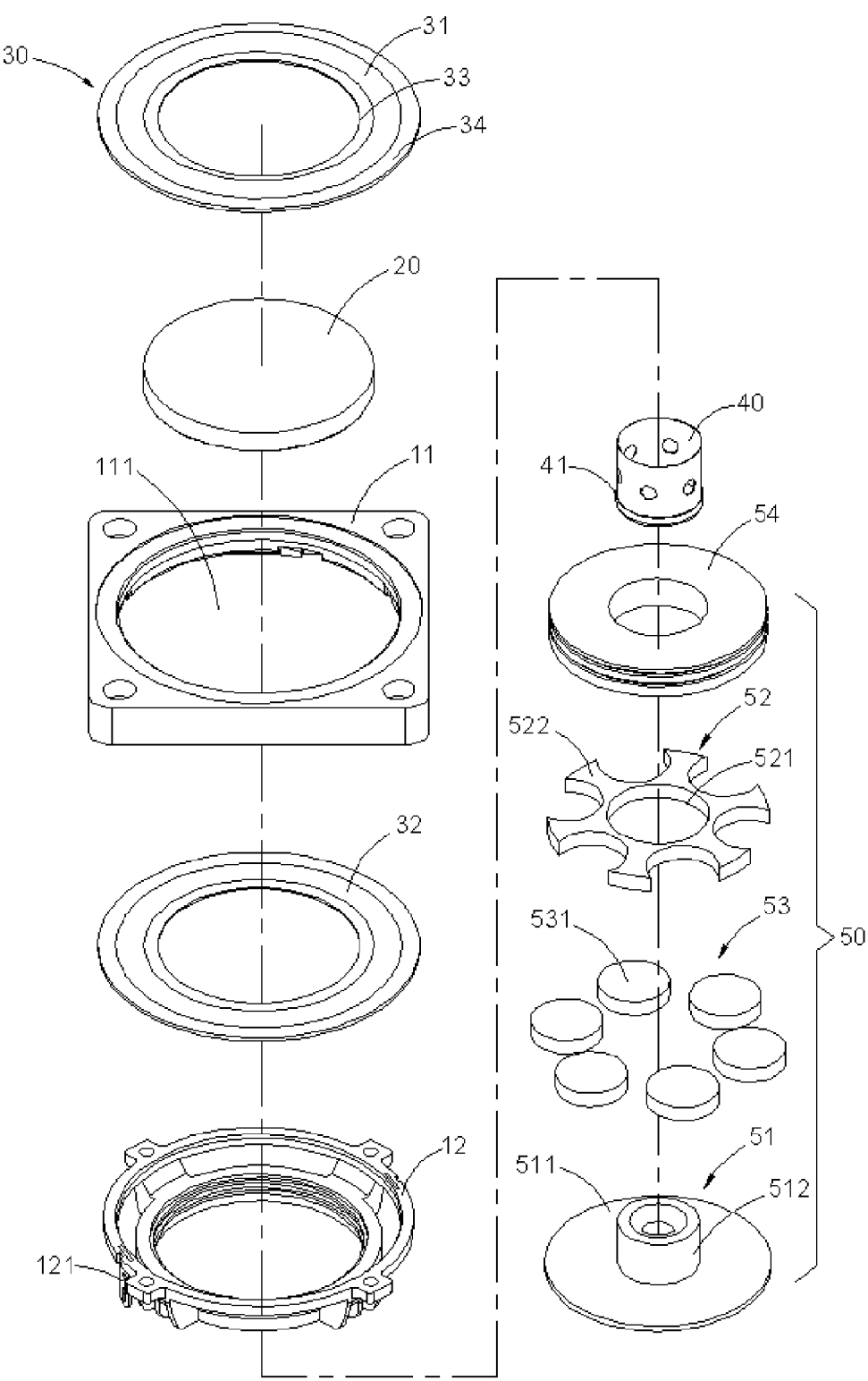
FIG. 2 is an exploded view of the ultra electromagnetic vibration device according to the preferred embodiment of the present invention.
Figure 3:
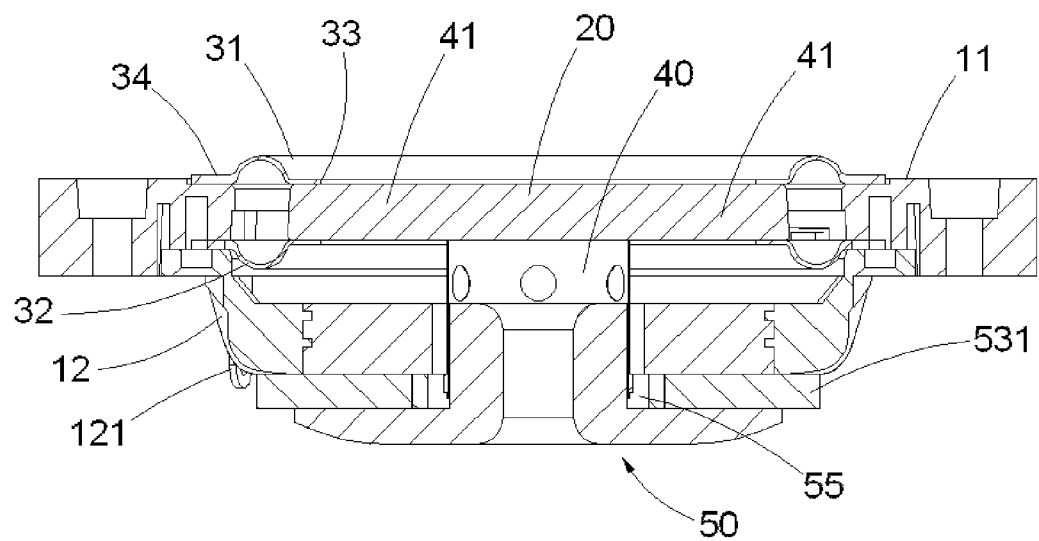
FIG. 3 is a sectional view of the ultra electromagnetic vibration device according to the preferred embodiment of the present invention.

Referring to FIG. 1 and FIG. 2, an ultrathin electromagnetic vibrating device comprises: a base frame 10, a vibrating reed 20, a set of surrounds 30, a voice coil 40 and a magnetic circuit system 50, wherein the base frame 10 comprises a base 11 and a connecting frame 12, the base 11 has a hole 111 provided in a central position thereof, the connecting frame 12 is fixedly connected on the base 11, two metal terminals 121 are provided on the connecting frame 12;

the vibrating reed 20 is provided on the base 11 in a position of the hole 111;

the surrounds 30 is fixedly connected with the vibrating reed 20 and the base 10, the surrounds 30 comprise an upper surround 31 and a lower surround 32, wherein the upper surround 31 and the lower surround 32 both have a first connecting surface 33 provided on a corresponding inner edge of a corresponding inner ring surface, respectively fixedly provided on outer edges of an upper surface and a lower surface of the vibrating reed 20, the upper surround 31 and the lower surround 32 both have a second connecting surface 34 provided on a corresponding outer edge of a corresponding outer ring surface, respectively fixedly provided on inner edges of an upper surface and a lower surface of the base 11;

further, the vibrating reed 20 is fixedly provided on the base 11 via connecting with the upper surround 31 and the lower surround 32 further, the upper surround 31 and the lower surround 32 are respectively fixedly connected with the upper surface and the lower surface of the vibrating reed 20 in opposite directions, and are also fixed between the upper surface and the lower surface of the base 11;

a first end of the voice coil 40 is fixedly connected with the vibrating reed 20 in a central position of the lower surface thereof, the voice coil 40 comprises a connecting terminal 41 connected with the metal terminals 121 on the connecting frame 12;

Referring to FIG. 3 of the drawings, it is worth mentioning that the upper surround 31 and the lower surround 32 are respectively connected with the upper surface and the lower surface of the vibrating reed 20, for fixedly connecting the vibrating reed 20 with the base 11 of the base frame 10, on the other hand, due to an application of the lower surround 32 to form a combined action of the upper surround 31 and the lower surround 32, the vibrating reed 20 is only able to keep vibrating up and down vertically, the first end of the voice coil 40 is fixedly provided on the lower surface of the vibrating reed 20, similarly, while a stroke of the voice coil 40 drives the vibrating reed 20 to vibrate up and down vertically, the voice coil 40 achieves an up-and-down vertical stroke, in such a manner that a function of a damper in a traditional electromagnetic vibrating device is replaced.

Figure 4:
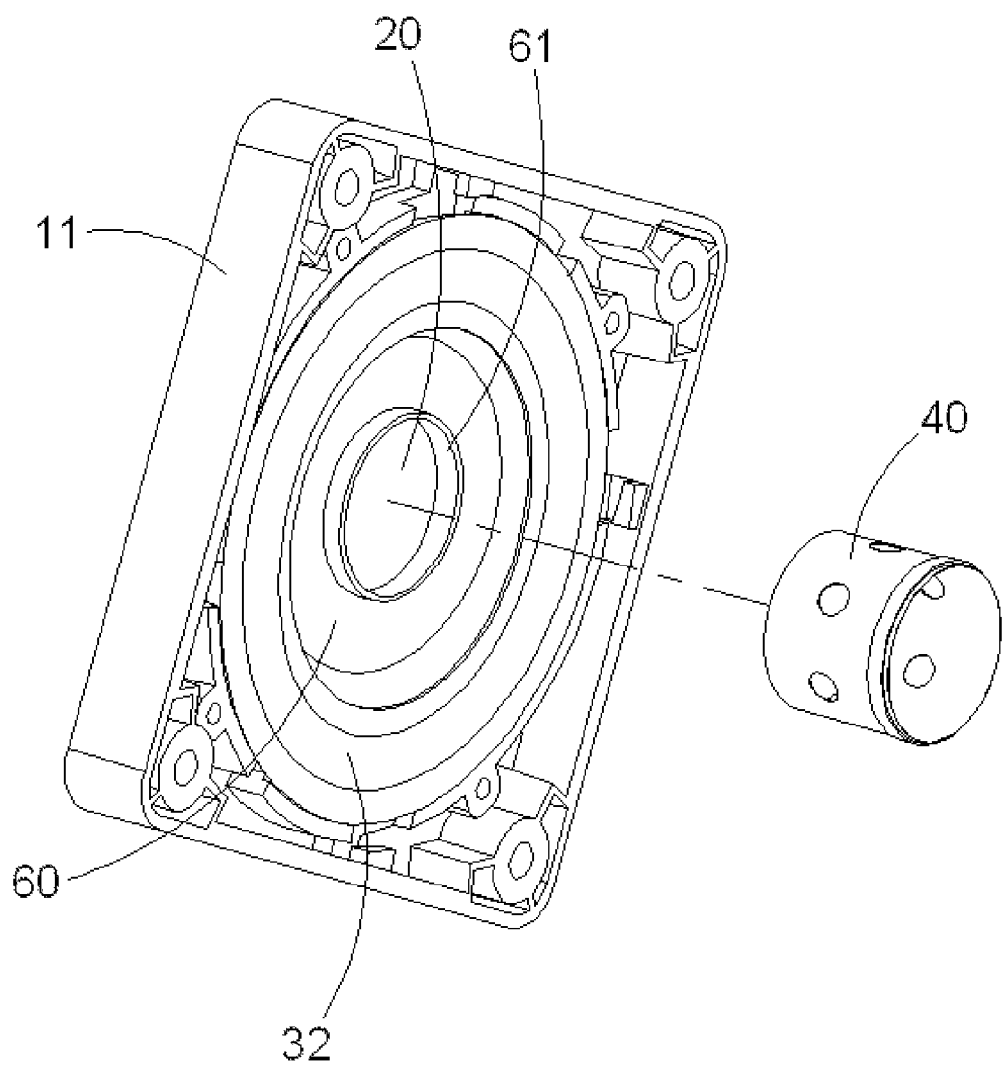
FIG. 4 is a partially sketch view of an upper surround, a lower surround, a vibrating reed and a base according to the preferred embodiment of the present invention.

Referring to FIG. 4, it is worth mentioning that the electromagnetic vibrating device further comprises a voice coil tray 60, fixedly adhered with the vibrating reed 20 in the central position of the lower surface thereof, the voice coil tray 60 is round, a first surface of the voice coil tray 60 is fixedly adhered on the lower surface of the vibrating reed 20, the voice coil tray 60 has an adhering portion 61, which is raised and is circularly provided on a second surface thereof, the first end of the voice coil is fixedly connected with the raised adhering portion 61 on the second surface of the voice coil tray 60 to increase an adhering area between the voice coil 40 and the vibrating reed 20, in such a manner that the voice coil 40 is able to be located better and not easy to shift during a bonding process.

Referring to FIG. 2 and FIG. 3, the magnetic circuit system 50 is fixedly connected with the base frame 10, further, the magnetic circuit system 50 is fixedly connected with the connecting frame 12 of the base frame 10, the magnetic circuit system comprises: a T-yoke 51, a locating plate 52, a set of magnets 53 and a top plate 54; wherein the T-yoke 51 is in a shape of inverted "T", the T-yoke comprises a round platform 511 and a fixing axle 512, the fixing axle 512 is fixedly provided in a central position of the round platform 511 and extends upwards over a length, the locating plate 52 is fixedly provided on a surface of the platform 511, and has a central ring 521 and a set of synapses 522, the central ring 521 and the platform 511 are coaxial, further, the fixing axle 512 crosses through the central ring 521, the synapses 522 extend outwards from the central ring 521 to an edge of the platform 511 along a radial direction of the central ring 521, the set of magnets 53 comprises at least six round magnets 531, each round magnet 531 is provided between two corresponding adjacent synapses 522 of the locating plate 52, the round magnets 531 and the corresponding synapses 522 match in shape and are fixed together, all the round magnets 531 are located in a same circle to form a magnet ring, the top plate 54 is fixedly provided on upper surfaces of the set of magnets 53 and the locating plate 52 to form the whole magnetic circuit system 50.

Further, a voice coil stroke space 55 is defined between inner ring surfaces of the locating plate 52 and the top plate 54 and the fixing axle 512, the second end of the voice coil 40 is placed in the voice coil stroke space 55.

A manufacturing method of an ultrathin electromagnetic vibration device, comprising:

a) putting the upper surround, the vibrating reed, the lower surround and the connecting frame into a base frame mould in turn, and integrating into the base frame via insert molding;

b) putting a U-yoke, the locating plate, the magnets and the top plate into a connecting frame mould in turn, and integrating into a whole via injection molding and insert molding to form the magnetic circuit system;

c) fixedly connecting the first end of the voice coil with the vibrating reed in the central position of the lower surface thereof; and d) fixedly connecting the base frame with the magnetic circuit system.

Further, the base frame and the magnetic circuit system are fixedly bonded via ultrasound, or other methods, such as turnbuckle, hot-melting, riveting, and locking screw.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An ultrathin electromagnetic vibrating device, comprising:
a base frame comprising a base having an upper surface, a lower surface and a hole formed therethrough, wherein said base frame further comprises a connecting frame coupled to said base and two metal terminals provided at said connecting frame;

a vibrating reed disposed in said hole of said base and having a planar shape to define an upper surface and a lower surface;

a magnetic circuit system fixedly connected with said base frame, wherein said magnetic circuit system is integrated with said connecting frame;

a voice coil having a first end fixedly provided in a central position of said lower surface of said vibrating reed for driving said vibrating reed to be vibrated in response to said magnetic circuit system, wherein said voice coil comprises a connecting terminal connected with said metal terminals; and a surround set which comprises an upper surround and a lower surround, each of said upper surround and said lower surround having an inner ring surface and an outer ring surface, wherein said inner ring surface of said upper surround is coupled at said upper surface of said vibrating reed in a glue-less manner and an outer ring surface of said upper surround is coupled at said upper surface of said base of said base frame in a glue-less manner, wherein said inner ring surface of said lower surround is coupled at said lower surface of said vibrating reed in a glue-less manner and said outer ring surface of said lower surround is coupled at said lower surface of said base of said base frame in a glue-less manner, wherein said upper surround and said lower surround are mold-injected to couple between said vibrating reed and said base of said base frame that said upper surround and said lower surround are integrated between said vibrating reed and said base to ensure said vibrating reed to be only vibrated up-and-down vertical stroke within said hole of said base frame.

2. The electromagnetic vibrating device, as recited in claim 1, wherein said upper surround and said lower surround are respectively connected with said upper surface and said lower surface of said vibrating reed in opposite directions to ensure said vibration reed to be vibrated in a balanced up-and-down stroke manner.

3. The electromagnetic vibrating device, as recited in claim 2, further comprising a circular voice coil tray fixedly adhered in said central position of said lower surface of said vibrating reed, wherein said voice coil tray has a first surface fixedly adhered on said lower surface of said vibrating reed, and an adhering portion which is raised and circularly provided on a second surface of said voice coil tray, wherein said first end of said voice coil is fixedly connected with said raised adhering portion on said second surface of said voice coil tray to enlarge an adhering area between said voice coil and said vibrating reed.

4. The electromagnetic vibrating device, as recited in claim 3, wherein said magnetic circuit system comprises a T-yoke, a locating plate, a set of magnets and a top plate, wherein said T-yoke is in shape of an inverted "T" and comprises a round platform and a fixing axle, wherein said fixing axle is fixedly provided in a central position of said round platform, wherein said locating plate is fixedly provided on a surface of said platform, and has a central ring and a set of synapses, wherein said central ring and said platform are coaxial, wherein said fixing axle crosses through said central ring, said synapses extend outwards from said central ring to an edge of said platform along a radial direction of said central ring, wherein said set of magnets comprises at least six round magnets, each of said round magnets provided between two corresponding adjacent synapses of said locating plate, wherein said round magnets and said corresponding synapses match in shape and are fixed together, wherein all of said round magnets are located in a same circle to form a magnet ring, wherein said top plate is fixedly provided on upper surfaces of said set of magnets and said locating plate, wherein said T-yoke, said locating plate, said magnets and said top plate are molded into said connecting frame to form said whole magnetic circuit system.

5. The electromagnetic vibrating device, as recited in claim 4, wherein a voice coil stroke space is defined between inner ring surfaces of said locating plate and said top plate and said fixing axle, wherein a second end of said voice coil is placed in said voice coil stroke space.

6. The electromagnetic vibrating device, as recited in claim 2, wherein said magnetic circuit system comprises a T-yoke, a locating plate, a set of magnets and a top plate, wherein said T-yoke is in shape of an inverted "T" and comprises a round platform and a fixing axle, wherein said fixing axle is fixedly provided in a central position of said round platform, wherein said locating plate is fixedly provided on a surface of said platform, and has a central ring and a set of synapses, wherein said central ring and said platform are coaxial, wherein said fixing axle crosses through said central ring, said synapses extend outwards from said central ring to an edge of said platform along a radial direction of said central ring, wherein said set of magnets comprises at least six round magnets, each of said round magnets provided between two corresponding adjacent synapses of said locating plate, wherein said round magnets and said corresponding synapses match in shape and are fixed together, wherein all of said round magnets are located in a same circle to form a magnet ring, wherein said top plate is fixedly provided on upper surfaces of said set of magnets and said locating plate, wherein said T-yoke, said locating plate, said magnets and said top plate are molded into said connecting frame to form said whole magnetic circuit system.

7. The electromagnetic vibrating device, as recited in claim 6, wherein a voice coil stroke space is defined between inner ring surfaces of said locating plate and said top plate and said fixing axle, wherein a second end of said voice coil is placed in said voice coil stroke space.

8. The electromagnetic vibrating device, as recited in claim 1, further comprising a circular voice coil tray fixedly adhered in said central position of said lower surface of said vibrating reed, wherein said voice coil tray has a first surface fixedly adhered on said lower surface of said vibrating reed, and an adhering portion which is raised and circularly provided on a second surface of said voice coil tray, wherein said first end of said voice coil is fixedly connected with said raised adhering portion on said second surface of said voice coil tray to enlarge an adhering area between said voice coil and said vibrating reed.

9. The electromagnetic vibrating device, as recited in claim 1, wherein said magnetic circuit system comprises a T-yoke, a locating plate, a set of magnets and a top plate, wherein said T-yoke is in shape of an inverted "T" and comprises a round platform and a fixing axle, wherein said fixing axle is fixedly provided in a central position of said round platform, wherein said locating plate is fixedly provided on a surface of said platform, and has a central ring and a set of synapses, wherein said central ring and said platform are coaxial, wherein said fixing axle crosses through said central ring, said synapses extend outwards from said central ring to an edge of said platform along a radial direction of said central ring, wherein said set of magnets comprises at least six round magnets, each of said round magnets provided between two corresponding adjacent synapses of said locating plate, wherein said round magnets and said corresponding synapses match in shape and are fixed together, wherein all of said round magnets are located in a same circle to form a magnet ring, wherein said top plate is fixedly provided on upper surfaces of said set of magnets and said locating plate, wherein said T-yoke, said locating plate, said magnets and said top plate are molded into said connecting frame to form said whole magnetic circuit system.

10. The electromagnetic vibrating device, as recited in claim 9, wherein a voice coil stroke space is defined between inner ring surfaces of said locating plate and said top plate and said fixing axle, wherein a second end of said voice coil is placed in said voice coil stroke space.

11. A vibration unit for an electromagnetic vibrating device which comprises a magnetic circuit system and a voice coil, comprising:
   a base frame comprising a base having an upper surface, a lower surface and a hole formed therethrough, wherein said base frame further comprises a connecting frame coupled to said base and two metal terminals provided at said connecting frame for connecting to a connecting terminal of the voice coil, wherein said base frame is arranged for connecting the magnetic circuit system that said connecting frame is arranged for being molded and integrated with the magnetic circuit system;
   a vibrating reed disposed in said hole of said base frame and having a planar shape to define an upper surface and a lower surface, wherein said vibrating reed is arranged for connecting to the voice coil at a position that the voice coil is connected to a central position of said lower surface of said vibrating reed for driving said vibrating reed to be vibrated in response to said magnetic circuit system; and
   a surround set which comprises an upper surround and a lower surround, each of said upper surround and said lower surround having an inner ring surface and an outer ring surface, wherein said inner ring surface of said upper surround is coupled at said upper surface of said vibrating reed in a glue-less manner and an outer ring surface of said upper surround is coupled at said upper surface of said base of said base frame in a glue-less manner, wherein said inner ring surface of said lower surround is coupled at said lower surface of said vibrating reed in a glue-less manner and said outer ring surface of said lower surround is coupled at said lower surface of said base of said base frame in a glue-less manner, wherein said upper surround and said lower surround are mold-injected to couple between said vibrating reed and said base frame that said upper surround and said lower surround are integrated between said vibrating reed and said base to ensure said vibrating reed to be only vibrated up-and-down vertical stroke within said hole of said base frame.

12. The vibration unit, as recited in claim 11, wherein said upper surround and said lower surround are respectively connected with said upper surface and said lower surface of said vibrating reed in opposite directions to ensure said vibration reed to be vibrated in a balanced up-and-down stroke manner.

13. The vibration unit, as recited in claim 12, wherein said inner ring surface of said upper surround is integrated with said upper surface of said vibrating reed and an outer ring surface of said upper surround is integrated with said upper surface of said base frame, wherein said inner ring surface of said lower surround is integrated with said lower surface of said vibrating reed and said outer ring surface of said lower surround is integrated with said lower surface of said base frame.

14. The vibration unit, as recited in claim 13, further comprising a circular voice coil tray fixedly adhered in said central position of said lower surface of said vibrating reed, wherein said voice coil tray has a first surface fixedly adhered on said lower surface of said vibrating reed, and an adhering portion which is raised and circularly provided on a second surface of said voice coil tray, wherein said raised adhering portion on said second surface of said voice coil tray is arranged for connecting to said first end of said voice coil to enlarge an adhering area between said voice coil and said vibrating reed.

15. The vibration unit, as recited in claim 12, further comprising a circular voice coil tray fixedly adhered in said central position of said lower surface of said vibrating reed, wherein said voice coil tray has a first surface fixedly adhered on said lower surface of said vibrating reed, and an adhering portion which is raised and circularly provided on a second surface of said voice coil tray, wherein said raised adhering portion on said second surface of said voice coil tray is arranged for connecting to said first end of said voice coil to enlarge an adhering area between said voice coil and said vibrating reed.

16. The vibration unit, as recited in claim 11, wherein said inner ring surface of said upper surround is integrated with said upper surface of said vibrating reed and an outer ring surface of said upper surround is integrated with said upper surface of said base frame, wherein said inner ring surface of said lower surround is integrated with said lower surface of said vibrating reed and said outer ring surface of said lower surround is integrated with said lower surface of said base frame.

17. The vibration unit, as recited in claim 11, further comprising a circular voice coil tray fixedly adhered in said central position of said lower surface of said vibrating reed, wherein said voice coil tray has a first surface fixedly adhered on said lower surface of said vibrating reed, and an adhering portion which is raised and circularly provided on a second surface of said voice coil tray, wherein said raised adhering portion on said second surface of said voice coil tray is arranged for connecting to said first end of said voice coil to enlarge an adhering area between said voice coil and said vibrating reed.

* * * * *